(12) United States Patent
Miyashita et al.

(10) Patent No.: US 8,400,096 B2
(45) Date of Patent: Mar. 19, 2013

(54) MAGNETIC ENCODER AND ACTUATOR

(75) Inventors: Kunio Miyashita, Nagano (JP); Toshiki Maruyama, Nagano (JP); Tsukasa Koto, Nagano (JP)

(73) Assignee: Harmonic Drive Systems Inc., Tokyo (JP)

( * ) Notice: Subject to any disclaimer, the term of this patent is extended or adjusted under 35 U.S.C. 154(b) by 342 days.

(21) Appl. No.: 12/737,027

(22) PCT Filed: Jun. 20, 2008

(86) PCT No.: PCT/JP2008/001594
§ 371 (c)(1),
(2), (4) Date: Dec. 1, 2010

(87) PCT Pub. No.: WO2009/153839
PCT Pub. Date: Dec. 23, 2009

(65) Prior Publication Data
US 2011/0156505 A1    Jun. 30, 2011

(51) Int. Cl.
*G05B 19/29* (2006.01)
(52) U.S. Cl. .................... 318/602; 324/207.25
(58) Field of Classification Search .................. 318/600, 318/601, 602; 324/207.11, 207.13, 207.25
See application file for complete search history.

(56) References Cited

U.S. PATENT DOCUMENTS

| | | | |
|---|---|---|---|
| 5,187,724 A * | 2/1993 | Hibino et al. | 377/17 |
| 5,276,722 A * | 1/1994 | Aoki et al. | 377/49 |
| 6,064,198 A * | 5/2000 | Wolf et al. | 324/207.2 |
| 7,042,211 B2 * | 5/2006 | Kabashima et al. | 324/207.25 |
| 2005/0127906 A1 * | 6/2005 | Miyashita et al. | 324/207.25 |
| 2007/0164733 A1 | 7/2007 | Kabashima et al. | |

FOREIGN PATENT DOCUMENTS

| | | |
|---|---|---|
| JP | 06-010813 | 2/1994 |
| JP | 10-019602 | 1/1998 |
| JP | 2001-004405 | 1/2001 |
| JP | 2004-354120 | 12/2004 |

\* cited by examiner

*Primary Examiner* — Rina Duda
(74) *Attorney, Agent, or Firm* — Flynn, Thiel, Boutell & Tanis, P.C.

(57) ABSTRACT

First to fourth magnetic detection units (22-25) are arranged in opposition to a multipole magnetized surface (21a) of a multipole magnet (21) of a magnetic encoder (17). The first and second magnetic detection units (22, 23) are placed on positions separated from each other by 180 degrees on the periphery of the center of the multipole magnet and output an A-phase signal and a B-phase signal. The third and fourth magnetic detection units (24, 25) are placed on positions separated from each other by nearly 180 degrees on the periphery of the center of the multipole magnet and output an A-phase reverse signal and a B-phase reverse signal. Detection signals of the same phase are synthesized and averaged, and consequently a detection error generated by an outer magnetic flux extending in the diameter direction of the multipole magnet can be removed. The signal obtained by synthesizing the detection signals of the same phase and averaging the same and the reverse signal of a signal obtained by synthesizing reverse signals of the reverse phase and averaging the same are synthesized and averaged, and consequently the detection error generated by the outer magnetic flux radially extending in one direction along the radius direction of the multipole magnet can be removed.

6 Claims, 7 Drawing Sheets

(∗1) COMPUTE THE ROTATIONAL ANGLE θ1 OF THE TWO-POLE MAGNET
(∗2) COMPUTE THE ROTATIONAL ANGLE θ2 OF THE MULTIPOLE MAGNET
(∗3) COMPUTE THE ABSOLUTE ROTATIONAL ANGLE θ0

MAGNETIC ENCODER AND ACTUATOR

TECHNICAL FIELD

The present invention relates to a magnetic encoder for detecting the rotational angle position of a motor shaft or other rotating member by using a multipole magnet and magnetic detection elements; and more specifically relates to a magnetic encoder capable of removing detection errors caused by magnetic noise penetrating from the exterior, and to an actuator in which the magnetic encoder has been mounted.

BACKGROUND ART

There are known magnetic encoders provided with a ring-shaped multipole magnet coaxially mounted on a rotating member of a measurement object, and Hall elements or other magnetic detection elements arranged so as to face the multipole magnetized surface formed on the external peripheral surface or the like of the multipole magnet. This type of magnetic encoder is disclosed in Patent Document 1.

The encoder device disclosed in Patent Document 1 is provided with two magnetic drums coaxially mounted on the rotating shaft of a motor or the like. A two-pole magnetization pattern is formed on the external peripheral surface of a first drum, and the external peripheral surface of the second drum is divided into 64 sections in the circumferential direction to form a 64-pole multipole magnetization pattern. First and second magnetic sensors are arranged at 90° angular intervals facing the magnetized surface of the first drum. Third and fourth magnetic sensors are arranged facing the magnetized surface of the second drum, and the angular interval of these magnetic sensors is set to an integral multiple of 90°.

With the encoder device of Patent Document 1, an A-phase signal and a B-phase signal that differ in phase by 90° are outputted from the first and second magnetic sensors when the rotating shaft rotates, and these output signals are converted to rectangular waves and inputted to a rotational direction discrimination circuit, whereby a +1 or −1 rotational frequency signal can be outputted for each rotation in accordance with the rotational direction. A C-phase signal and D-phase signal that differ in phase by integral multiples of 90° are outputted from the third and fourth sensors. In this encoder device, predetermined signal processing is carried out using computation means or a combination of circuits on the basis of the A- to D-phase signals, whereby the absolute rotational position can be detected with a resolution that corresponds to the number of poles in the multipole magnetization pattern.

[Patent Document 1] Japanese Laid-open Utility Model Application No. 06-10813

DISCLOSURE OF THE INVENTION

Problems to be Solved by the Invention

With a magnetic encoder provided with a multipole magnet such as Patent Document 1, the magnetic detection elements arranged facing the magnetized surface of the multipole magnet detect leakage flux from the two-pole magnet, and it is possible that when a multipole magnet (second drum) and a two-pole magnet (first drum) are arranged in close proximity, an error component produced by the two-pole magnet will be included in the detection signal. In the case that an encoder provided with a multipole magnet is mounted on the actuator of a motor or the like with an electromagnetic brake, the magnetic encoder detects leakage flux from the brake coil of the electromagnetic brake, and it is possible that an error component produced by the brake coil will be included in the detection signal. Detection precision by the magnetic encoder is reduced when such an error component cannot be removed from the detection signal.

In view of the foregoing, an object of the present invention is to provide a magnetic encoder capable of removing detection errors produced by magnetic noise from the exterior and carrying out angle detection with good precision, and to provide an actuator on which the magnetic encoder is mounted.

Means Used to Solve the Above-Mentioned Problems

In order to solve the problems described above, the magnetic encoder of the present invention characterized in comprising:

a multipole magnet having a circular multipole magnetized surface in which magnetic N poles and S poles are formed in alternating fashion at equiangular intervals in a circumferential direction; and first to fourth magnetic detection units arranged in different angular positions in the circumferential direction of the multipole magnetized surface in order to detect changes in the magnetic field accompanying the rotation of the multipole magnet, wherein the first magnetic detection unit has an A-phase first magnetic detection element and a B-phase first magnetic detection element that are arranged adjacently so that sensing surfaces thereof face the multipole magnetized surface across a fixed gap, and output a sinusoidal A-phase signal and B-phase signal, respectively, which differ in phase by 90°, in accompaniment with the rotation of the multipole magnet;

the second magnetic detection unit has an A-phase second magnetic detection element and a B-phase second magnetic detection element that are arranged adjacently so that sensing surfaces thereof face the multipole magnetized surface across a fixed gap, and output a sinusoidal A-phase signal and B-phase signal, respectively, which differ in phase by 90°, in accompaniment with the rotation of the multipole magnet;

the third magnetic detection unit has an A-phase third magnetic detection element and a B-phase third magnetic detection element that are arranged adjacently so that sensing surfaces thereof face the multipole magnetized surface across a fixed gap, and output an A-phase reverse signal, which is the reverse phase of the A-phase signal, and B-phase reverse signal, which is the reverse phase of the B-phase signal, respectively, in accompaniment with the rotation of the multipole magnet;

the fourth magnetic detection unit has an A-phase fourth magnetic detection element and a B-phase fourth magnetic detection element that are arranged adjacently so that sensing surfaces thereof face the multipole magnetized surface across a fixed gap, and output an A-phase reverse signal, which is the reverse phase of the A-phase signal, and B-phase reverse signal, which is the reverse phase of the B-phase signal, respectively, in accompaniment with the rotation of the multipole magnet;

the A-phase second magnetic detection element and the B-phase second magnetic detection element of the second magnetic detection unit are arranged in an angular position about 180° apart from the A-phase first magnetic detection element and the B-phase first magnetic detection element of the first magnetic detection unit in terms of mechanical angle about the center of rotation of the multipole magnet; and the A-phase fourth magnetic detection element and the B-phase fourth magnetic detection element of the fourth magnetic detection unit are arranged in an angular position about 180° apart from the A-phase third magnetic detection element and the B-phase third magnetic detection element of the third magnetic detection unit in terms of mechanical angle about the center of rotation of the multipole magnet.

Provided that the first to fourth magnetic detection units of the magnetic encoder of the present invention are under the influence of external magnetic fields that extend in the diameter direction of the multipole magnet. In the first magnetic detection unit and the second magnetic detection unit, the A-phase first magnetic detection element and the A-phase second magnetic detection element are arranged on two sides in the diameter direction to the circular multipole magnetized surface of the multipole magnet, and the B-phase first magnetic detection element and the B-phase second magnetic detection element are also similarly arranged on two sides in the diameter direction. Therefore, the noise component caused by an external magnetic field that rides on the detection signal of the A-phase first magnetic detection element, and the noise component caused by an external magnetic field that rides on the detection signal of the B-phase second magnetic detection element have substantially the same magnitude but are opposite in polarity. Accordingly, the noise components caused by external magnetic fields that traverse the multipole magnet in the diameter direction can be offset by synthesizing and averaging the two A-phase signals. The same applies to the B-phase first magnetic detection element and the B-phase second magnetic detection element, and the noise components caused by external magnetic fields can be removed. The same applies to the third magnetic detection unit and the fourth magnetic detection unit. The noise components that ride on the detection signals of the A-phase third magnetic detection element and the A-phase fourth magnetic detection element can be offset, and the noise components that ride on the detection signals of the B-phase third magnetic detection element and the B-phase fourth magnetic detection element can be offset.

Provided that the first to fourth magnetic detection units of the magnetic encoder of the present invention are placed under the influence of external magnetic fields that radially extend in one radial direction from the center of rotation of the multipole magnet. In this case, noise components having substantially the same magnitude and the same polarity ride on the A-phase signals, which are the detection signals of the A-phase first magnetic detection element and the A-phase second magnetic detection element in the first and second magnetic detection units. Similarly, noise components having substantially the same magnitude and the same polarity ride on the A-phase reverse signals, which are the detection signals of the A-phase third magnetic detection element and the A-phase fourth magnetic detection element in the third and fourth magnetic detection units. The noise component contained in the A-phase signal and the noise component contained in the A-phase reverse signal have substantially the same magnitude, but the polarity is opposite. Therefore, the A-phase signal and the reverse signal of the A-phase reverse signal are synthesized and averaged, whereby the noise components can be removed. The same applies to the case of the B-phase signal and the B-phase reverse signal, and the noise components can be removed by synthesizing and averaging the B-phase signal and the reverse signal of the B-phase reverse signal.

With the magnetic encoder of the present invention, a plurality of magnetic detection elements are arranged in angular positions in the circumferential direction of the multipole magnetized surface. Variability of the detection signals caused by variability in the multipole magnetization pattern is averaged out by synthesizing the detection signals, and the variability of the detection signals caused by individual differences in the plurality of magnetic detection elements is averaged out. Changes in the offset output caused by changes in the sensor ambient temperature in the case in which a Hall sensor or the like is used as the magnetic detection element can be offset by averaging out the changes in the detection outputs of the plurality of magnetic detection elements arranged in different angular positions. Therefore, detection errors caused by these variabilities, temperature characteristics, and the like can be reduced and the detection precision of the rotational position is improved.

Here, the magnetic encoder of the present invention can be applied to absolute magnetic encoders that are capable of detecting the absolute position inside a single rotation of the rotating member by obtaining the magnetic position of the multipole magnet using a two-pole magnet.

In other words, in addition to the configuration described above, the absolute magnetic encoder of the present invention is characterized in having a two-pole magnet provided with a circular two-pole magnetized surface magnetized with two poles along the circumferential direction, and a two-pole-side magnetic detection unit provided with a pair of magnetic detection elements that output a sinusoidal A-phase signal and B-phase signal that differ in phase by 90°, which is a single period of a single rotation, in accompaniment with the rotation of the two-pole magnet, wherein the two-pole magnet is coaxially arranged adjacent to the multipole magnet and integrally rotates with the multipole magnet.

The leakage flux from the two-pole magnet is generated in a state that traverses the multipole magnet in the diameter direction and rotates in a state that traverses the diameter direction. The rotational position can be detected with good precision because the noise components produced by a external magnetic field that extends in the diameter direction of the multipole magnet can be offset as described above even when the noise components ride on the detection signals of the magnetic detection elements of the first to fourth magnetic detection units due to such leakage flux. The two-pole magnet and the multipole magnet can be arranged in close proximity because the two-pole magnet and the multipole magnet are not required to be set at a distance in order to reduce detection errors. Accordingly, it is advantageous to reduce the size of the magnetic encoder and, in particular, the axial length thereof.

The magnetic encoder of the present invention is suitable for mounting on an actuator having an electromagnetic brake, such as servomotor or the like. In such an actuator with an electromagnetic brake, a brake coil of the electromagnetic brake is coaxially arranged on a rotating member, and a state is formed in which the leakage flux radially extends in the same direction along the radial direction of the multipole magnet of the magnetic encoder mounted on the rotating member. The leakage flux may cause a reduction in the detection precision of the magnetic encoder in that noise components ride on the magnetic detection elements of the first to fourth magnetic detection unit. However, with the magnetic encoder of the present invention, the rotation position of the rotating member can be detected with good precision without being affected by the leakage flux of the brake coil because such noise components are removed as described above. Since the influence of leakage flux can be removed, the magnetic encoder can be arranged in close proximity to the electromagnetic brake. Accordingly, it is advantageous to reduce the size of the actuator having a magnetic encoder, and, in particular, the axial length thereof Effect of the Invention In accordance with the present invention, it is possible to remove detection errors of the magnetic detection elements caused by external magnetic flux extending in the diameter direction of the multipole magnet. Also, the detection errors of the magnetic detection elements caused by external magnetic flux radially extending in one direction along the radial direction of the multipole magnet can be removed. Therefore, the rotation position of the rotating member can be detected with good precision without being affected by leakage flux from the two-pole magnet for detecting the absolute position, and without being affected by leakage flux from the brake coil of the electromagnetic brake arranged on the rotating member as the detection target.

In accordance with present invention, the two-pole magnet can be arranged in close proximity to the multipole magnet because the influence of leakage flux can be removed in the manner described above, and since the magnetic encoder can be arrange in close proximity to the position of the electromagnetic brake on the rotating member, the magnetic encoder can be made smaller, and this is advantageous for reducing the size of an actuator provided with a magnetic encoder.

BEST MODE FOR CARRYING OUT THE INVENTION

An embodiment of the magnetic encoder and actuator to which the present invention has been applied is described below with reference to the drawings.

Figure 1:
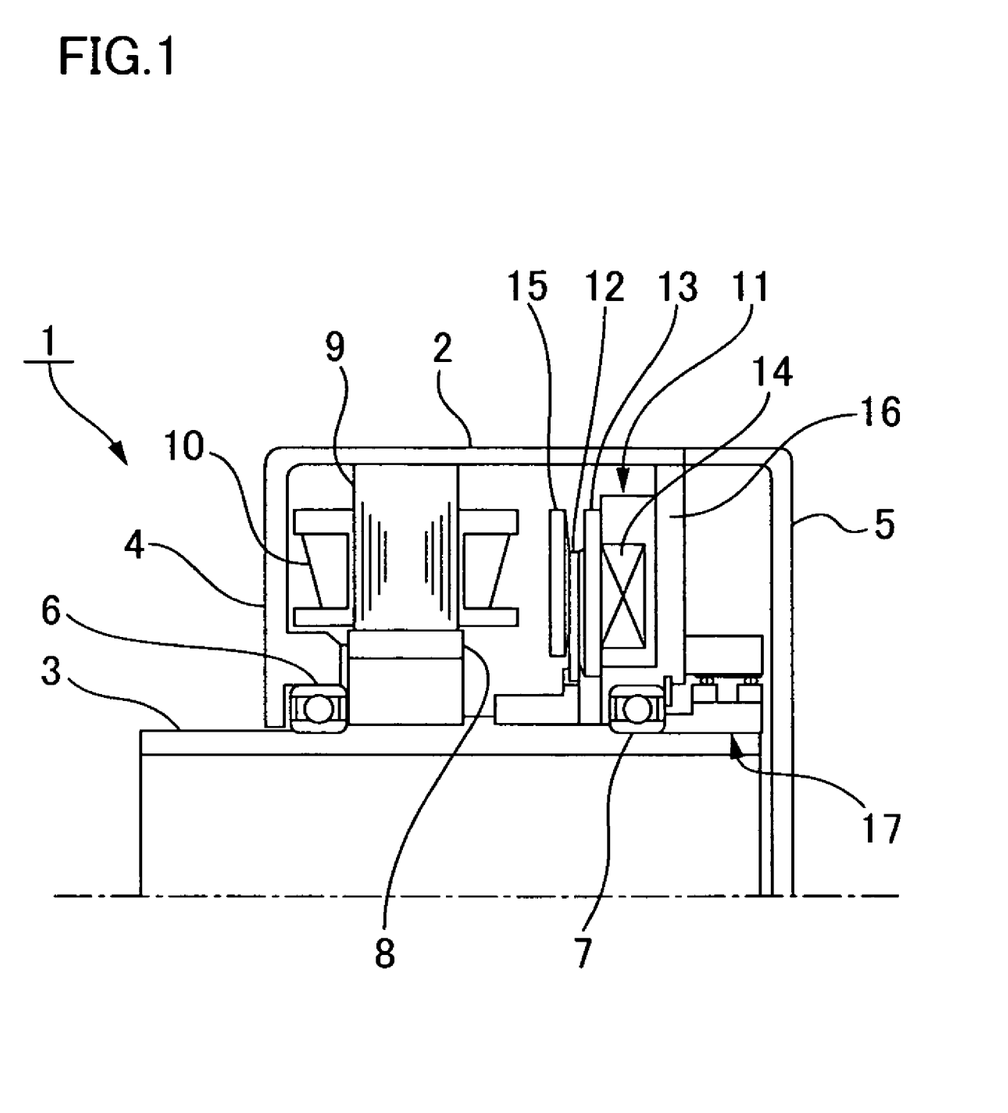
FIG. 1 is a partial cross-sectional view of a servomotor in which the magnetic encoder of the present invention has been incorporated.
Figure 2:
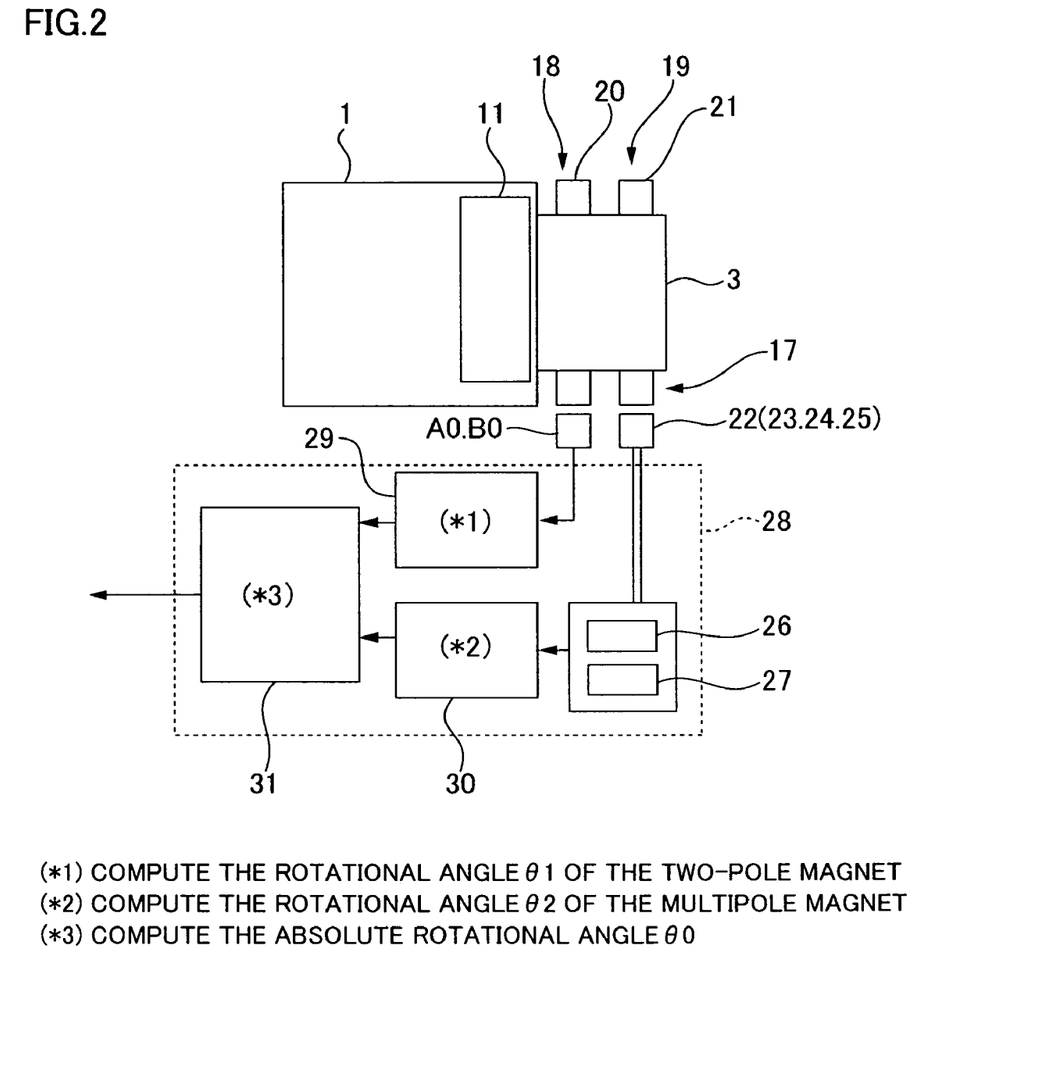
FIG. 2 is a schematic structural view of the servomotor in which the magnetic encoder of the present invention has been incorporated.

FIG. 1 is a half cross-sectional view of the servomotor in which the magnetic encoder has been incorporated, and FIG. 2 is a schematic structural diagram thereof A servomotor 1 (actuator) is provided with a motor shaft 3 (rotating member) that extends in the forward/rearward direction through the center of a cylindrical motor housing 2. The distal end of the motor shaft 3 protrudes forward from the motor housing 2 through the center portion of an end bracket 4 which closes off the front end of the motor housing 2. The rear end of the motor housing 2 is closed off by a cup-shaped encoder cover 5. The motor shaft 3 is rotatably supported via bearings 6, 7, which are supported by the motor housing 2. A rotor 8 is integrally formed in a coaxial state with the motor shaft 3 in the front-side portion inside the motor housing 2. An iron core 9 secured to the internal peripheral surface of the motor housing 2 faces the external peripheral surface of the rotor 8, and a motor coil 10 is mounted on the iron core 9.

An electromagnetic brake 11 is arranged on the portion on the bearing 7 side of the motor shaft 3. The electromagnetic brake 11 is provided with a brake disc 12 spline-linked in a coaxial state to the motor shaft 3. A disc-shaped brake movable unit 13 is arranged so as to face the brake disc 12 along the axial direction. The brake movable unit 13 presses a stopper 15 to the brake disc 12 using a spring force (not shown). When a brake coil 14 is excited, the brake movable unit 13 moves away from the brake disc 12 side against the spring force and the brake force for stopping the rotation of the motor shaft 3 is released. The brake coil 14 is supported by a bracket 16 secured to the motor housing 2.

The read end portion of the motor shaft 3 is positioned inside the encoder cover 5 mounted on the rear end portion of the motor housing 2. Rotation detection units 18, 19 of an absolute magnetic encoder 17 for detecting the absolute rotational angle of the motor shaft 3 is arranged in close proximity in the axial direction on the rear end portion of the motor shaft 3.

Figure 3A:
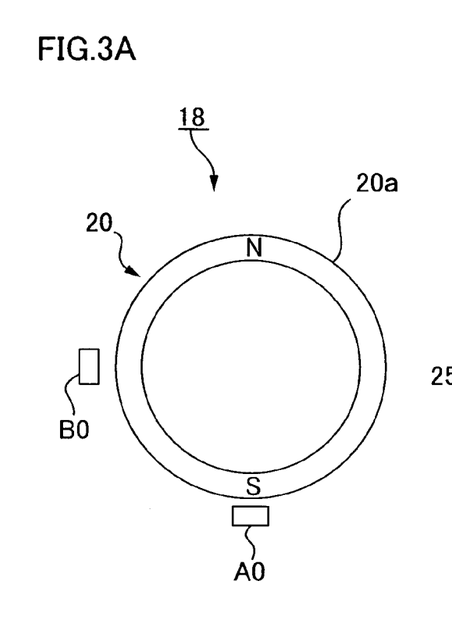
FIG. 3A is a front view of the rotation detection unit of the two-pole magnet.
Figure 3B:
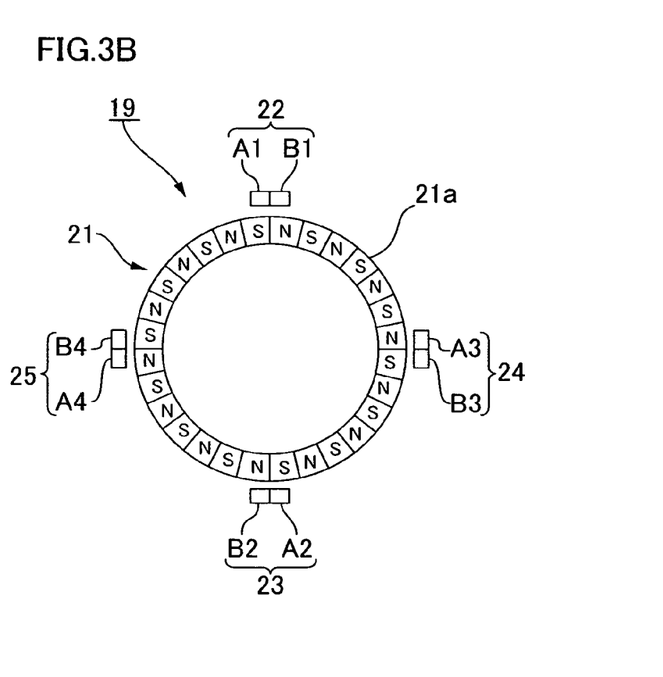
FIG. 3B is a front view of the rotation detection unit of the multipole magnet.

FIG. 3A is a front view of the rotation detection unit 18, and FIG. 3B is a front view of the rotation detection unit 19. Following is a description with reference to these drawings. The rotation detection unit 18 of the magnetic encoder 17 is provided with a two-pole magnet 20 coaxially secured to the motor shaft 3, and Hall sensors or other magnetic detection elements A0, B0 arranged facing the external peripheral surface of the two-pole magnet 20. A rotation detection unit 19 is provided with a multipole magnet 21 coaxially secured to the motor shaft 3, and four first to fourth magnetic detection units 22 to 25 arranged facing the external peripheral surface of the multipole magnet 21.

The two-pole magnet 20 and the multipole magnet 21 are formed with N and S magnetic poles arranged in alternating fashion on the circular external peripheral surface of a ring-shaped magnet material coaxially secured to the motor shaft 3. N and S poles are formed in positions 180° away from each other on a two-pole magnetized surface 20a formed on the circular external peripheral surface of the two-pole magnet 20. N and S poles are formed in alternating fashion at equi-angular intervals on the multipole magnet magnetized surface 21a formed on the circular external peripheral surface of the multipole magnet 21. For example, the multipole magnet magnetized surface 21a is magnetized with 28 poles.

The magnetic detection element A0 and the magnetic detection element B0 are arranged in angular positions set apart by 90° about the center of rotation of the motor shaft 3, which is the rotational center of the two-pole magnet 20, so that the sensing surfaces face the two-pole magnetized surface 20a with a fixed gap. When the two-pole magnet 20 makes a single rotation, a single period of sinusoidal detection signals that differ in phase by 90° are outputted from the magnetic detection elements.

Each of the first to fourth magnetic detection units 22 to 25 arranged facing the multipole magnet magnetized surface 21a of the multipole magnet 21 is composed of two adjacently arranged magnetic detection elements, each of the units being separated by an electrical angle of 90° from the other.

The first magnetic detection unit 22 is provided with an A-phase first magnetic detection element A1 and a B-phase first magnetic detection element B1 that are adjacently arranged so that the sensing surfaces thereof face the multipole magnet magnetized surface 21a with a fixed gap, and output a sinusoidal A-phase signal and B-phase signal, respectively, which differ in phase by 90°, in accompaniment with the rotation of the multipole magnet 21. The second magnetic detection unit 23 is provided with an A-phase second magnetic detection element A2 and a B-phase second magnetic detection element B2 that are adjacently arranged so that the sensing surfaces thereof face the multipole magnet magnetized surface 21a with a fixed gap, and output a sinusoidal A-phase signal and B-phase signal, respectively, which differ in phase by 90°, in accompaniment with the rotation of the multipole magnet 21.

The third magnetic detection unit 24 is provided with an A-phase third magnetic detection element A3 and a B-phase third magnetic detection element B3 that are adjacently arranged so that the sensing surfaces thereof face the multipole magnet magnetized surface 21a with a fixed gap, and output an A-phase reverse signal, which is the reverse phase of the A-phase signal, and a B-phase reverse signal, which is the reverse phase of the B-phase signal, respectively, in accompaniment with the rotation of the multipole magnet 21. The fourth magnetic detection unit 25 is provided with an A-phase fourth magnetic detection element A4 and a B-phase fourth magnetic detection element B4 that are adjacently arranged so that the sensing surfaces thereof face the multipole magnet magnetized surface 21a with a fixed gap, and output an A-phase reverse signal, which is the reverse phase of the A-phase signal, and B-phase reverse signal, which is the reverse phase of the B-phase signal, respectively, in accompaniment with the rotation of the multipole magnet 21.

The A-phase second magnetic detection element A2 and the B-phase second magnetic detection element B2 of the second magnetic detection unit 23 are arranged at an angular position 180° away from the A-phase first magnetic detection element A1 and the B-phase first magnetic detection element B1 of the first magnetic detection unit 22 in terms of mechanical angle about the rotational center of the multipole magnet 21.

The A-phase third magnetic detection element A3 and the B-phase third magnetic detection element B3 of the third magnetic detection unit 24 are arranged at an angular position substantially 90° away from the A-phase first magnetic detection element A1 and the B-phase first magnetic detection element B1 of the first magnetic detection unit 22 in terms of mechanical angle about the rotational center of the multipole magnet 21.

The A-phase fourth magnetic detection element A4 and the B-phase fourth magnetic detection element B4 of the fourth magnetic detection unit 25 are arranged at an angular position 180° away from the A-phase third magnetic detection element A3 and the B-phase third magnetic detection element B3 of the third magnetic detection unit 24 in terms of mechanical angle about the rotational center of the multipole magnet 21.

With the 28-pole multipole magnetization pattern in the multipole magnet magnetized surface 21a, the A-phase first magnetic detection element A1 and the A-phase second magnetic detection element A2 in the first magnetic detection unit 22 and the second magnetic detection unit 23 constantly face a magnetic pole having the same polarity because the polarity of a magnetic pole in a position separated by 180° from a single magnetic pole in terms of mechanical angle is the same polarity. For example, in a state in which the multipole magnet 21 is in the rotational position shown in FIG. 3B, the A-phase first magnetic detection element A1 and the A-phase second magnetic detection element A2 both face an S pole. The B-phase first magnetic detection element B1 and the B-phase second magnetic detection element B2 in the first magnetic detection unit 22 and the second magnetic detection unit 23 are in positions separated by an electrical angle of 90° with respect to the A-phase first magnetic detection element A1 and the A-phase second magnetic detection element A2, and therefore face a magnetic pole of opposite polarity from the magnetic pole that magnetic detection elements A1, A2 are facing. In the state shown in FIG. 3B, the magnetic detection elements B1, B2 face a N pole.

On the other hand, the A-phase third magnetic detection element A3 and the A-phase fourth magnetic detection element A4 of the third and fourth magnetic detection units 24, 25, which are in positions rotated 90° by mechanical angle from the first and second magnetic detection units 22, 23, are constantly facing a magnetic pole of opposite polarity from the magnetic poles that A-phase first magnetic detection element A1 and A-phase second magnetic detection element A2 are facing. For example, in a state in which the multipole magnet 21 is in the rotational position shown in FIG. 3B, the A-phase third magnetic detection element A3 and the A-phase fourth magnetic detection element A4 are both facing an N pole. The other B-phase third magnetic detection element B3 and B-phase fourth magnetic detection element B4 of the third and fourth magnetic detection units 24, 25 are in positions separated by an electrical angle of 90° from the A-phase third magnetic detection element A3 and the A-phase fourth magnetic detection element A4, and therefore face an S pole in the state shown in FIG. 3B.

The third and fourth magnetic detection units 24, 25 can be arranged in angular positions other than angular positions rotated 90° from the first and second magnetic detection units 22, 23. In this case as well, the third and fourth magnetic detection units 24, are arranged in different angular positions from the first and second magnetic detection units 22, 23; the A-phase third magnetic detection element A3 and A-phase fourth magnetic detection element A4 face a magnetic pole of opposite polarity from the A-phase first magnetic detection element A1 and A-phase second magnetic detection element A2; and the B-phase third magnetic detection element B3 and B-phase fourth magnetic detection element B4 are arranged so as to face a magnetic pole of opposite polarity from the B-phase first magnetic detection element B1 and B-phase second magnetic detection element B2.

The magnetic detection elements in such an arrangement output sinusoidal signals commensurate with 28 periods during a single rotation of the multipole magnet 21 in accompaniment with the rotation of the multipole magnet 21. The A-phase first magnetic detection element A1 and A-phase second magnetic detection element A2 output in-phase sinusoidal A-phase signals, and the A-phase third magnetic detection element A3 and A-phase fourth magnetic detection element A4 output sinusoidal A-phase reverse signals, which are the reverse phase of the A-phase signals. The B-phase first magnetic detection element B1 and B-phase second magnetic detection element B2 output sinusoidal B-phase signals that differ in phase by 90° from the A-phase first magnetic detection element A1 and A-phase second magnetic detection element A2. The B-phase third magnetic detection element B3 and B-phase fourth magnetic detection element B4 output sinusoidal B-phase reverse signals, which are the reverse phase of the B-phase first magnetic detection element B1 and the B-phase second magnetic detection element B2.

Figure 4:
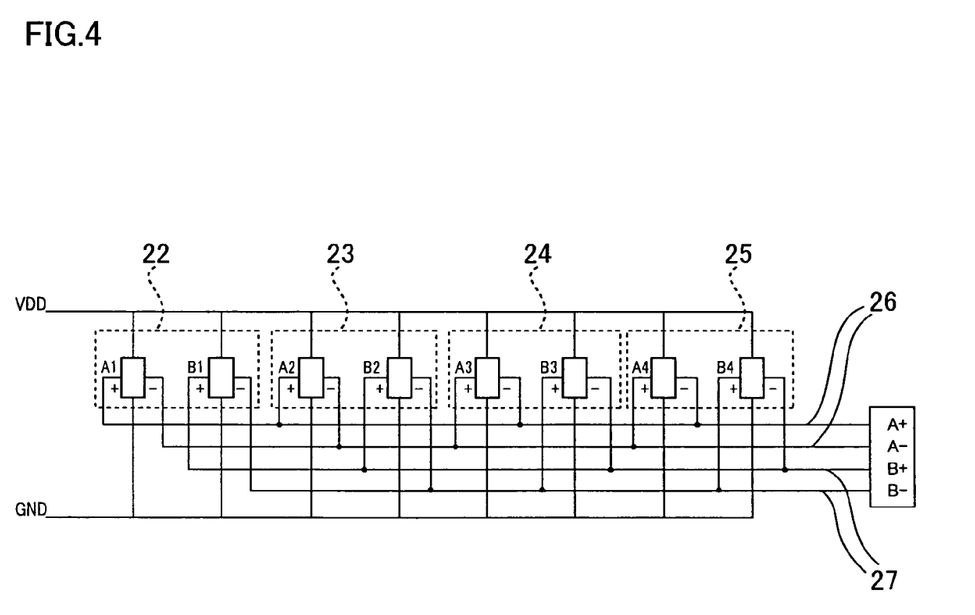
FIG. 4 is a wiring diagram of the output terminals of the magnetic sensor elements.

FIG. 4 is a wiring diagram of the output terminals of the magnetic sensor elements (Hall elements) of the first to fourth magnetic detection units 22 to 25. In an A-phase connection circuit 26, the A-phase first magnetic detection element A1 and A-phase second magnetic detection element A2 for outputting A-phase signals are connected in parallel in the forward direction, as shown in the drawing. On the other hand, the A-phase third magnetic detection element A3 and A-phase fourth magnetic detection element A4 for outputting A-phase reverse signals are connected in parallel to the A-phase first magnetic detection element A1 and A-phase second magnetic detection element A2 in a state in which the positive and negative output terminals are inverted. The B-phase magnetic detection units B1 to B4 are similarly connected in a B-phase connection circuit 27. It is possible to obtain averaged signals expressed in the following formulas, wherein the output signals of the magnetic detection units A1 to A4 and B1 to B4 are expressed as (A1) to (A4), (B1) to (B4), and A and B are the synthesized signals of the output signals obtained from the magnetic detection elements.

$$A=[\{(A1)+(A2)\}-\{(A3)+(A4)\}]/4$$

$$B=[\{(B1)+(B2)\}-\{(B3)+(B4)\}]/4$$

A signal processing unit 28 of the magnetic encoder 17 is provided with a two-pole angle computation unit 29 for computing the rotational angle θ1 of the two-pole magnet 20 on the basis of the detection signals from the magnetic sensor elements A0, B0 of the rotation detection unit 18; a multipole angle computation unit 30 for computing the rotational angle θ2 of the multipole magnet 21 on the basis of the synthesized signals of the detection signals from the four magnetic sensor elements and outputted from the A-phase connection circuit 26 and B-phase connection circuit 27 described above; and an absolute angle computation unit 31 for computing the absolute rotational angle θ0 of the motor shaft 3 on the basis of the output from the two-pole angle computation unit 29 and the multipole angle computation unit 30.

The two-pole angle computation unit 29 can compute the rotational angle θ1 of the two-pole magnet 20 by carrying out predetermined signal processing on the detection signals that differ in phase by 90° from the magnetic detection elements A0, B0, for example.

The multipole angle computation unit 30 can detect the rotational angle θ2, which indicates the rotational position of each pole pair of the multipole magnet 21, by carrying out predetermined signal processing on the detection signals of the magnetic detection elements or on the synthesized A-phase signal and B-phase signal outputted from the A-phase connection circuit 26 and the B-phase connection circuit 27.

The absolute angle computation unit 31 calculates the pole pair number Ni of the multipole signal on the basis of the signal 91 from the two-pole angle computation unit 29, and together with the multipole angle signal θ2, computes the overall rotational angle θ0 of the motor shaft 3 on the basis of the following formula.

$$θ0=(Ni×360/P)+(θ2/P)$$

In the formula, $0 \leq Ni \leq P-1$ (P: number of pole pairs of the multipole magnet).

Figure 5A:
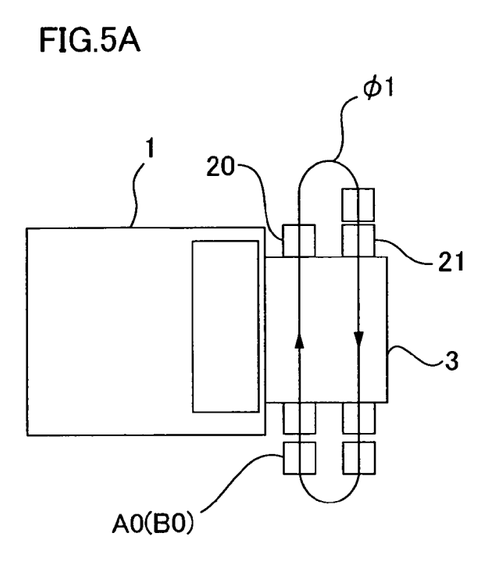
FIG. 5A is a side view showing the magnetic field produced by the two-pole magnet.
Figure 5B:
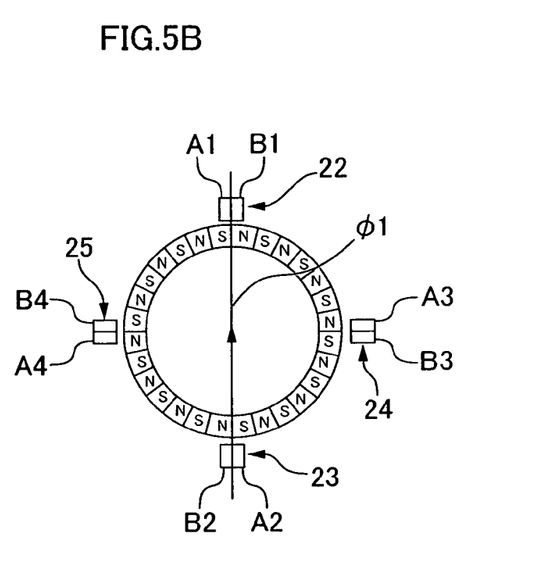
FIG. 5B is a plan view showing the magnetic field produced by the two-pole magnet.

FIGS. 5A and 5B are a side view and a plan view showing the magnetic field produced by the two-pole magnet 20. The removal of detection error caused by the magnetic field produced by the two-pole magnet 20 will be described with reference to these drawings.

In the magnetic encoder 17 the two-pole magnet 20 is arranged in close proximity to the multipole magnet 21. The leakage flux φ1 from the two-pole magnet 20 traverses the multipole magnet 21 in the diameter direction. As shown in FIG. 5B, the largest noise component is included in the detection signals of the four magnetic detection elements A1, B1, A2, B2 in the rotational position where the leakage flux of the S pole and the N pole of the two-pole magnet 20 have interlinked perpendicular to the sensing surfaces of the A-phase first magnetic detection element A1 and B-phase first magnetic detection element B1 of the first magnetic detection unit 22 and the A-phase second magnetic detection element A2 and B-phase second magnetic detection element B2 of the second magnetic detection unit 23.

In this case, fluctuation in the detection signals (A1), (B1) due to the effect of magnetic flux φ1 in the A-phase first magnetic detection element A1 and the B-phase first magnetic detection element B1, which are in the position of the first magnetic detection unit 22, is of opposite polarity but substantially the same magnitude as the fluctuation in the detection signals (A2), (Bb) due to the effect of magnetic flux φ1 in the A-phase second magnetic detection element A2 and the B-phase second magnetic detection element B2, which are in the position of the second magnetic detection unit 23. Therefore, the error component caused by leakage flux of the two-pole magnet 20 contained in the detection signal is offset in the A-phase connection circuit 26 by synthesizing and averaging out the detection signals of the A-phase first magnetic detection element A1 and A-phase second magnetic detection element A2. Similarly, the error component is offset in the B-phase connection circuit 27 by synthesizing and averaging the detection signals of the magnetic sensor elements B1, B2.

The leakage flux φ1 also rotates in accompaniment with the rotation of the two-pole magnet 20. Since the error component is offset in the same manner in the third and fourth magnetic detection units 24, 25, the error component caused by the leakage flux from the two-pole magnet 20 can be removed in any rotation position.

Figure 6A:
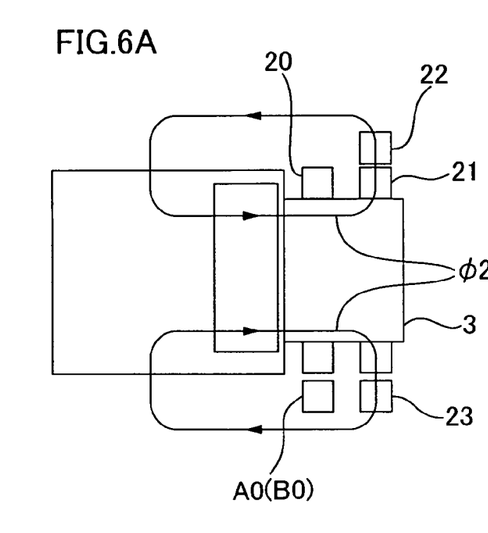
FIG. 6A is a side view showing the brake magnetic field produced by an electromagnetic brake.
Figure 6B:
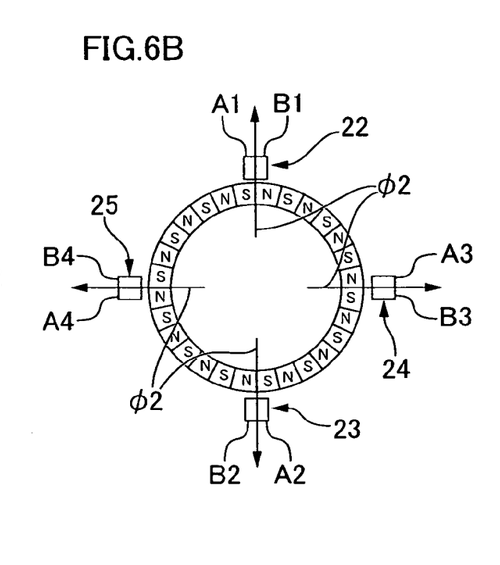
FIG. 6B is a plan view showing the brake magnetic field produced by an electromagnetic brake.

Next, FIGS. 6A and 6B are a side view and plan view showing the brake magnetic field produced by an electromagnetic brake when the brake coil 14 has been excited. The removal of detection error caused by the brake magnetic field produced when the brake coil 14 of the electromagnetic brake 11 has been excited will be described with reference to these drawings.

In the servomotor 1, the magnetic encoder 17 is mounted in close proximity to the electromagnetic brake 11. The orientation of the leakage flux φ2 of the brake magnetic field radially extends in a single direction along the radial direction from the center of rotation of the motor shaft 3, which is the center of rotation of the multipole magnet 21. Errors that correspond to the leakage flux ride on the detection signals when the magnetic detection elements of the first to fourth magnetic detection units 22 to 25 detect the leakage flux from the brake coil extending in the radial direction in this manner.

The detection error caused by leakage flux that extends in the radial direction in this manner appears as an error component having the same magnitude and polarity in the detection signals of the magnetic detection elements. Therefore, the error component contained in the A-phase signal can be removed in the A-phase connection circuit 26 by synthesizing and averaging the A-phase signals obtained from the A-phase first magnetic detection element A1 and A-phase second magnetic detection element A2; synthesizing and averaging the A-phase reverse signals obtained from the A-phase third magnetic detection element and the A-phase fourth magnetic detection element; and synthesizing and averaging the reverse signals of the signals obtained by averaging the A-phase reverse signals with the signals obtained by averaging the A-phase signals. Similarly, the error component contained in the B-phase signal can be removed in the B-phase connection circuit 27 by synthesizing and averaging the B-phase first magnetic detection element B1 and B-phase second magnetic detection element B2; synthesizing and averaging the B-phase third magnetic detection element B3 and B-phase fourth magnetic detection element B4; and synthesizing and averaging the reverse signals of the signals obtained by averaging the B-phase reverse signals with the signals obtained by averaging the B-phase signals. Accordingly, the rotational position of the motor shaft 3 can be detected with good precision using the A-phase signals and the B-phase signals from which the error component has been removed.

No limitation is imposed by the brake magnetic field produced by the electromagnetic brake 11 using the two-pole magnet 20, and detection errors from external magnetic fields can be removed in cases in which similar external magnetic fields are present due to some other cause.

As described above, with the magnetic encoder 17, there is no need to set the two-pole magnet and the multipole magnet 21 at a distance and the two-pole magnet 20 and multipole magnet 21 can be arranged in close proximity because detection errors caused by the two-pole magnet 20 can be reduced. Therefore, the magnetic encoder 17 can be made smaller. Also, the servomotor 1 with a magnetic encoder can be made smaller because the magnetic encoder 17 and the electromagnetic brake 11 are not required to be set at a distance from each other.

Variability in the detection signals caused by variability in the multipole magnetization pattern of the multipole magnet 21 is averaged out, and variability in the detection signals caused by individual differences in the plurality of magnetic sensor elements is averaged out because the detection signals from the magnetic sensor elements arranged in different directions facing the multipole magnetized surface are synthesized by signal processing as described above by the A-phase connection circuit 26 and the B-phase connection circuit 27. It is also possible to offset variation in the offset output due to changes in the ambient temperature of the sensors in the case that Hall sensors or the like are used as a magnetic sensor elements. Therefore, detection errors caused by these variabilities, temperature characteristics, and the like can be reduced and the detection precision of the rotational position of the motor shaft 3 is further improved.

Next, other configuration examples of the rotation detection unit in a multipole magnet will be described. The number of poles of the multipole magnet 21 of the rotation detection unit 19 shown in FIG. 3B is 28, but the number of poles in the multipole magnet 21 may be suitably varied in accordance with the resolution or the like to be achieved by the magnetic encoder 17. As described above, in a 28-pole multipole magnet, the polarity of the two magnetic poles in positions exactly 180° apart in terms of the mechanical angle is the same, and such a magnetic pole arrangement does not vary in the case that the number of poles of the multipole magnet is an integral multiple of 4. Therefore, in such cases, error components caused external magnetic fields can be removed by using sensor arrangement and signal processing such as that described above.

Figure 7:
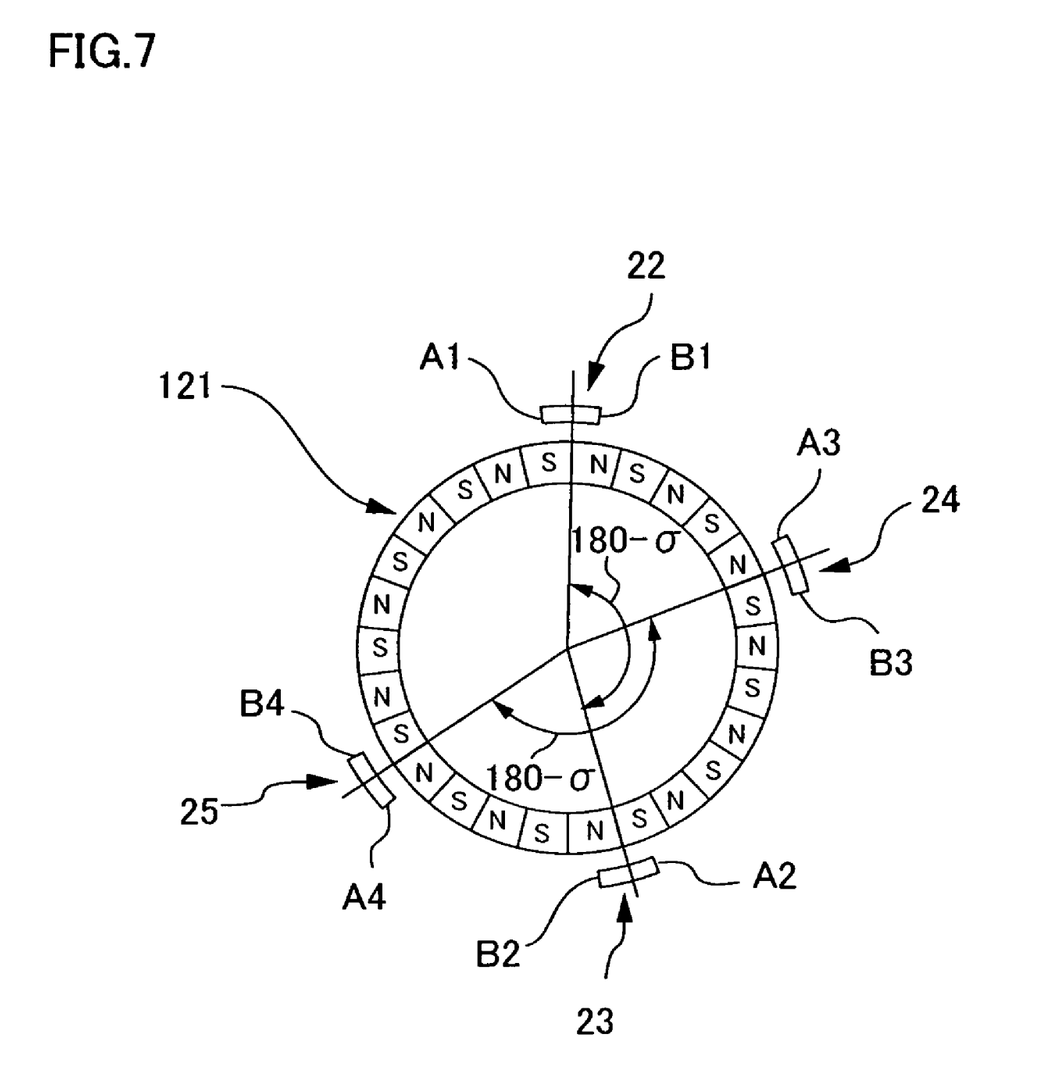
FIG. 7 is a front view of a rotation detection unit in a multipole magnet implementation with a different number of poles.

However, in the case that the number of poles of the multipole magnet is not an integral multiple of 4, the polarity of the two magnetic poles in positions exactly 180° apart in terms of mechanical angle is not the same. FIG. 7 is a front view of a rotation detection unit in a multipole magnet implementation with a different number of poles from FIG. 3B. As shown in FIG. 7, the polarity of the two magnetic poles in positions exactly 180° apart in terms of mechanical angle is not the same in the 26-pole multipole magnet 121. In view of such a case, the A-phase first magnetic detection element A1 and B-phase first magnetic detection element B1 of the first magnetic detection unit 22 are arranged in angular positions set apart by (180−δ) degrees in terms of the mechanical angle in relation to the A-phase second magnetic detection element A2 and B-phase second magnetic detection element B2 of the second magnetic detection unit 23. The same applies to the third magnetic detection element and the fourth magnetic detection element, and the two elements groups, i.e., the A-phase third magnetic detection element and the A-phase fourth magnetic detection element, and the B-phase third magnetic detection element and the B-phase fourth magnetic detection element, are arranged in angular positions set apart by (180−δ) degrees in terms of the mechanical angle. Signal processing is carried out in similar fashion to the embodiment described above.

In this case, δ is the angle interval of a single magnetic pole in the multipole magnet 121, and δ=(360/26) degrees in the case of 26 poles. In other words, the angular positions set apart by (180−δ) degrees in terms of the mechanical angle are the angular positions of the poles of the same polarity that are arranged apart by angular intervals nearest to 180°, and in the case of 26 poles, (180−(360/26)) degrees is 166.2°. Therefore, in a configuration such as that of FIG. 7, it is possible to synthesize and average the detection signals of the same phase from two magnetic detection sensor elements arranged in positions set apart by a mechanical angle substantially equal to 180°. Therefore, the noise component caused by leakage flux from the two-pole magnet that rides on the detection signals can be offset in the same manner as the case in which the 28-pole multipole magnet 21 is used, and the error component can be removed.

The invention claimed is:

1. A magnetic encoder characterized in comprising:
   a multipole magnet having a circular multipole magnetized surface in which magnetic N poles and S poles are formed in alternating fashion at equiangular intervals in a circumferential direction; and
   first to fourth magnetic detection units arranged in different angular positions in the circumferential direction of said multipole magnetized surface in order to detect changes in the magnetic field accompanying said rotation of the multipole magnet, wherein
   said first magnetic detection unit has an A-phase first magnetic detection element and a B-phase first magnetic detection element that are adjacently arranged so that sensing surfaces thereof face said multipole magnetized surface across a fixed gap, and output a sinusoidal A-phase signal and B-phase signal, respectively, which differ in phase by 90°, in accompaniment with the rotation of said multipole magnet;
   said second magnetic detection unit has an A-phase second magnetic detection element and a B-phase second magnetic detection element that are adjacently arranged so that sensing surfaces thereof face said multipole magnetized surface across a fixed gap, and output a sinusoidal A-phase signal and B-phase signal, respectively, which differ in phase by 90°, in accompaniment with the rotation of said multipole magnet;
   said third magnetic detection unit has an A-phase third magnetic detection element and a B-phase third magnetic detection element that are adjacently arranged so that sensing surfaces thereof face said multipole magnetized surface across a fixed gap, and output an A-phase reverse signal, which is the reverse phase of the A-phase signal, and B-phase reverse signal, which is the reverse phase of the B-phase signal, respectively, in accompaniment with the rotation of said multipole magnet;

said fourth magnetic detection unit has an A-phase fourth magnetic detection element and a B-phase fourth magnetic detection element that are adjacently arranged so that sensing surfaces thereof face said multipole magnetized surface across a fixed gap, and output an A-phase reverse signal, which is the reverse phase of the A-phase signal, and B-phase reverse signal, which is the reverse phase of the B-phase signal, respectively, in accompaniment with the rotation of said multipole magnet;

said A-phase second magnetic detection element and said B-phase second magnetic detection element of said second magnetic detection unit are arranged in an angular position about 180° apart from said A-phase first magnetic detection element and said B-phase first magnetic detection element of said first magnetic detection unit in terms of mechanical angle about a center of rotation of said multipole magnet; and said A-phase fourth magnetic detection element and said B-phase fourth magnetic detection element of said fourth magnetic detection unit are arranged in an angular position about 180° apart from said A-phase third magnetic detection element and said B-phase third magnetic detection element of said third magnetic detection unit in terms of mechanical angle about the center of rotation of said multipole magnet.

2. The magnetic encoder according to claim 1, characterized in comprising a signal processing unit for removing from said A-phase signal and said B-phase signal a noise component caused by outer magnetic flux extending in a diameter direction of said multipole magnet and a noise component produced by outer magnetic flux extending in the same direction along a radial direction of said multipole magnet, wherein the signal processing unit synthesizes an averaged signal of the A-phase signal generated by synthesizing the A-phase signals outputted from said A-phase first magnetic detection element and said A-phase second magnetic detection element, and a reverse signal of an averaged signal of an A-phase reverse signal generated by synthesizing the A-phase reverse signals outputted from said A-phase third magnetic detection element and said A-phase fourth magnetic detection element, to thereby remove the noise component contained in the A-phase signal; and synthesizes an averaged signal of the B-phase signal generated by synthesizing the B-phase signals outputted from said B-phase first magnetic detection element and said B-phase second magnetic detection element, and a reverse signal of an averaged signal of a B-phase reverse signal generated by synthesizing the B-phase reverse signals outputted from said B-phase third magnetic detection element and said B-phase fourth magnetic detection element, to thereby remove the noise component contained in the B-phase signal.

3. The magnetic encoder according to claim 1, characterized in comprising:

a two-pole magnet provided with a circular two-pole magnetized surface magnetized with two poles along the circumferential direction; and a two-pole-side magnetic detection unit provided with a pair of magnetic detection elements that output a sinusoidal A-phase signal and B-phase signal that differ in phase by 90°, which is a single period of a single rotation, in accompaniment with the rotation of the two-pole magnet, wherein the two-pole magnet is coaxially arranged adjacent to the multipole magnet and integrally rotates with the multipole magnet.

4. The magnetic encoder according to claim 3, characterized in comprising a signal processing unit for removing from said A-phase signal and said B-phase signal the noise component caused by outer magnetic flux extending in the diameter direction of said multipole magnet and the noise component produced by outer magnetic flux extending in the same direction along the radial direction of said multipole magnet, wherein the signal processing unit synthesizes an averaged signal of the A-phase signal generated by synthesizing the A-phase signals outputted from said A-phase first magnetic detection element and said A-phase second magnetic detection element, and a reverse signal of an averaged signal of an A-phase reverse signal generated by synthesizing the A-phase reverse signals outputted from said A-phase third magnetic detection element and said A-phase fourth magnetic detection element, to remove the noise component contained in the A-phase signal; and synthesizes an averaged signal of the B-phase signal generated by synthesizing the B-phase signals outputted from said B-phase first magnetic detection element and said B-phase second magnetic detection element, and a reverse signal of an averaged signal of a B-phase reverse signal generated by synthesizing the B-phase reverse signals outputted from said B-phase third magnetic detection element and said B-phase fourth magnetic detection element, to remove the noise component contained in the B-phase signal.

5. An actuator characterized in comprising:

a rotating member;

an electromagnetic brake for imparting braking force to said rotating member; and a magnetic encoder for detecting a rotation angle position of said rotating member, wherein said magnetic encoder is the magnetic encoder cited in claim 2;

said electromagnetic brake is provided with a brake coil; and leakage flux from said brake coil extends in the same direction along the radial direction of said multipole magnet.

6. An actuator characterized in comprising:

a rotating member;

an electromagnetic brake for imparting braking force to said rotating member; and a magnetic encoder for detecting a rotation angle position of said rotating member, wherein said magnetic encoder is the magnetic encoder cited in claim 4;

said electromagnetic brake is provided with a brake coil; and leakage flux from said brake coil extends in the same direction along the radial direction of said multipole magnet.

* * * * *